US011968966B2

(12) United States Patent
Akiba (10) Patent No.: US 11,968,966 B2
(45) Date of Patent: Apr. 30, 2024

(54) REEL SEAT

(71) Applicant: GLOBERIDE, Inc., Tokyo (JP)

(72) Inventor: Masaru Akiba, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 17/204,135

(22) Filed: Mar. 17, 2021

(65) Prior Publication Data

US 2022/0030842 A1 Feb. 3, 2022

(30) Foreign Application Priority Data

Jul. 28, 2020 (JP) ................................ 2020-127191

(51) Int. Cl.
*A01K 87/06* (2006.01)
*A01K 87/08* (2006.01)

(52) U.S. Cl.
CPC .............. *A01K 87/06* (2013.01); *A01K 87/08* (2013.01)

(58) Field of Classification Search
CPC .... A01K 87/06; A01K 87/008; A01K 87/009; A01K 87/08
See application file for complete search history.

(56) References Cited

U.S. PATENT DOCUMENTS

| 4,334,378 A * | 6/1982 | Worth | A01K 87/08 43/22 |
| 4,726,139 A * | 2/1988 | Tokuda | A01K 87/06 43/22 |
| 4,762,584 A * | 8/1988 | Andreasen | A01K 87/08 264/254 |
| 4,860,484 A * | 8/1989 | Green | A01K 87/06 43/18.5 |
| 4,864,764 A * | 9/1989 | Yamato | A01K 87/06 43/22 |
| 5,088,225 A * | 2/1992 | Yamamoto | A01K 87/06 43/22 |

(Continued)

FOREIGN PATENT DOCUMENTS

| EP | 0700635 A1 | 3/1996 |
| JP | 02255033 A | 10/1990 |

(Continued)

OTHER PUBLICATIONS

Australian Examination Report for related Australian Application No. 2021201746; action dated Feb. 9, 2022; (7 pages).

(Continued)

*Primary Examiner* — Darren W Ark
*Assistant Examiner* — Katelyn T Truong
(74) *Attorney, Agent, or Firm* — Oliff PLC (57) ABSTRACT

A reel seat has a good handling property and good gripping comfortability at the time of gripping and holding a fishing rod with a fishing reel, further, the reel seat with which weight reduction is efficiently achieved. A seat main body of a reel seat has a divided structure of a first main body including a part where a reel foot mounting portion, a fixed hood, and a moving hood are arranged, the first main body being formed in a tubular shape secured on an outer peripheral surface of a fishing rod, and a second main body made of a material having strength equal to or less than the first main body, the second main body being disposed on and fixed to a surface of the first main body.

11 Claims, 6 Drawing Sheets

(56) References Cited

U.S. PATENT DOCUMENTS

| | | | | |
|---|---|---|---|---|
| 5,904,000 | A * | 5/1999 | Ohmura | A01K 87/06 43/22 |
| 6,105,302 | A * | 8/2000 | Yamamoto | A01K 87/08 43/23 |
| 10,010,773 | B1 * | 7/2018 | Pugliese | B62K 21/26 |
| 2002/0017050 | A1 * | 2/2002 | Irrgang | A01K 87/08 43/18.1 R |
| 2004/0211108 | A1 * | 10/2004 | Ezuka | A01K 87/08 43/18.1 R |
| 2008/0229646 | A1 * | 9/2008 | Huang | A01K 87/08 43/18.5 |
| 2015/0040463 | A1 * | 2/2015 | Lin | A01K 87/06 43/22 |
| 2017/0112113 | A1 * | 4/2017 | Huang | A01K 87/08 |
| 2020/0037590 | A1 | 2/2020 | Taniguchi et al. | |

FOREIGN PATENT DOCUMENTS

| | | | |
|---|---|---|---|
| JP | H0870738 | A | 3/1996 |
| JP | H08154540 | A | 6/1996 |
| JP | 09205944 | A | 8/1997 |
| JP | 2002112675 | A | 4/2002 |
| JP | 2006333728 | A | 12/2006 |
| JP | 2009240250 | A | 10/2009 |
| JP | 2009247222 | A | 10/2009 |
| JP | 2018-161061 | A | 10/2018 |
| KR | 102062710 | B1 | 1/2020 |

OTHER PUBLICATIONS

Second Australian Examination Report for related Australian Application No. 2021201746; action dated Mar. 9, 2022; (4 pages).
Chinese Office Action for related Chinese Application No. 202110515822.3; action dated Aug. 8, 2022; (22 pages).
Third Australian Examination Report for related Australian Application No. 2021201746; action dated Sep. 7, 2022; (5 pages).
Office Action in connection with related Japanese Patent Application No. 2020-127191; action dated Apr. 6, 2023; (7 pages).
Fourth Examination Report for related Australian Application No. 2021201746; action dated Feb. 1, 2023; (5 bages).
Second Examination Report for related Chinese Application No. 202110515822.3; action dated Jan. 28, 2023; (14 pages).
Office Action for related Japanese Application No. 2020-127191; action dated Jul. 20, 2023; (9 pages).

* cited by examiner

REEL SEAT

TECHNICAL FIELD

This disclosure relates to a reel seat attached to various fishing rods such as lure fishing rods and boat fishing rods and used for installing and fixing a reel.

BACKGROUND

Conventionally, a reel seat in which a reel is installed is fixed to a fishing rod that uses the reel. For example, as disclosed in Japanese Patent Application Publication No. 2018-161061, a tubular reel seat installed and fixed to an outer peripheral surface of a root rod is known. In JP '061, a tubular reel seat suitable for using a bait-casting reel is disclosed. In a main body formed in a tubular shape, a fixed hood is formed on the upper surface side of the base end side, and a trigger is formed on the lower surface side of the base end side. On the leading end side, a male screw portion is formed, and a moving hood to be moved forward and backward is arranged in that part by a nut. By mounting a reel foot on a reel foot mounting portion formed on an upper surface of the main body and moving the moving hood to the fixed hood side, the reel can be fixed. With a fishing rod in which such a reel seat is installed, while gripping a reel main body and the reel seat part by one hand, a casting operation and a winding and stowing operation are performed. Thus, it is preferable to have a good gripping property and light weight.

In general, the main body of the reel seat is integrally formed by injection-molding with resin. In this example, to improve the gripping property, there is a need for increasing thickness (increasing volume) to some extent. However, when thickness is increased too much, weight is increased and weight reduction cannot be achieved, and molding failure due to uneven thickness more easily occurs. Conversely, when thickness of an outer shape is decreased or a punched portion is formed to achieve weight reduction, upon gripping, gripping is less easily performed due to thinness. Further, many clearances are generated between a palm and fingers or the like, and the reel seat, the gripping property is deteriorated. In particular, when a punched part is increased and the diameter is excessively reduced in pursuit of weight reduction, it is not possible to ensure sufficient strength.

This disclosure is achieved focusing on the above problems, and a desired effect is to provide a reel seat having a good handling property and good gripping comfortability at the time of gripping and holding a fishing rod with a fishing reel, further, the reel seat with which weight reduction is efficiently achieved.

SUMMARY

To achieve the above object, a reel seat has a seat main body including a reel foot mounting portion on which a reel foot of a fishing reel is mounted, the seat main body having a fixed hood being formed on the axially one end side of the reel foot mounting portion, and a moving hood being arranged on the seat main body on the axially other side of the reel foot mounting portion movably along the axial direction, wherein the seat main body has a divided structure of a first main body including a part where the reel foot mounting portion, the fixed hood, and the moving hood are arranged, the first main body being formed in a tubular shape secured on an outer peripheral surface of a fishing rod, and a second main body made of a material having strength equal to or less than the first main body, the second main body being disposed on and fixed to a surface of the first main body, and the second main body forms a gripping portion including a half-tube portion which is superimposed on the first main body so that the reel foot mounting portion is exposed, and a tube portion which is superimposed on the first main body to cover the fixed hood.

Upon installing and fixing the fishing reel to the reel seat to fish, an angler performs an operation of the fishing rod and a winding and stowing operation of a handle in a state of gripping and holding the reel main body with the fishing rod (reel seat). In this example, a part where a large load is applied to the reel seat is the part where the reel foot mounting portion on which the reel foot of the fishing reel is mounted, the fixed hood that fixes the reel foot, and the moving hood are arranged. Thus, the seat main body has the divided structure of the first main body having the part where strength is required, and the second main body having the region (gripping portion) to be gripped and held mainly at the time of actual fishing. Thereby, even when the seat main body is formed in a shape having a good gripping property, punching can be efficiently made, and weight reduction is easily achieved as the reel seat (root rod). In particular, by making the first main body requiring strength of, for example, a plastic composite material reinforced by glass fiber or carbon fiber (FRP), and making the second main body of a material whose strength is equal to or less than FRP, specifically, a material with which touch at the time of gripping, a gripping property, and outer appearance can be improved and weight reduction can be achieved, for example, resin such as ABS and nylon, or elastomer, rubber and the like, it is possible to form the reel seat with which strength is high and weight is reduced.

The above reel seat can be applied to a reel seat to which a bait-casting reel is installed and fixed, and a reel seat to which a spinning reel is installed and fixed.

According to my reel seat, a handling property and gripping comfortability are good at the time of gripping and holding a fishing rod with a fishing reel, and further, weight reduction can be efficiently achieved.

BRIEF DESCRIPTION OF THE DRAWINGS

FIGS. 5A and 5B are views showing the first main body of the reel seat.

FIGS. 6A and 6B are views showing the second main body of the reel seat.

FIGS. 8A and 8B are views showing a modified example of a locking structure.

FIGS. 9A and 9B are views showing a second example of a reel seat.

EXPLANATION OF REFERENCE SIGNS 1, 1A Reel seat
2, 2A Seat main body
3 Reel foot mounting portion
5 Fixed hood
7 Moving hood
10 First main body
30 Second main body
31 Half-tube portion
32 Tube portion

DETAILED DESCRIPTION

Hereinafter, examples of a reel seat will be specifically described with reference to the attached drawings. In the following description, the axial direction (front to back direction) and the up and down direction are the directions shown in FIG. 1, and the left and right direction (sideways direction) indicates the direction orthogonal to the paper plane of FIG. 1.

Figure 1:
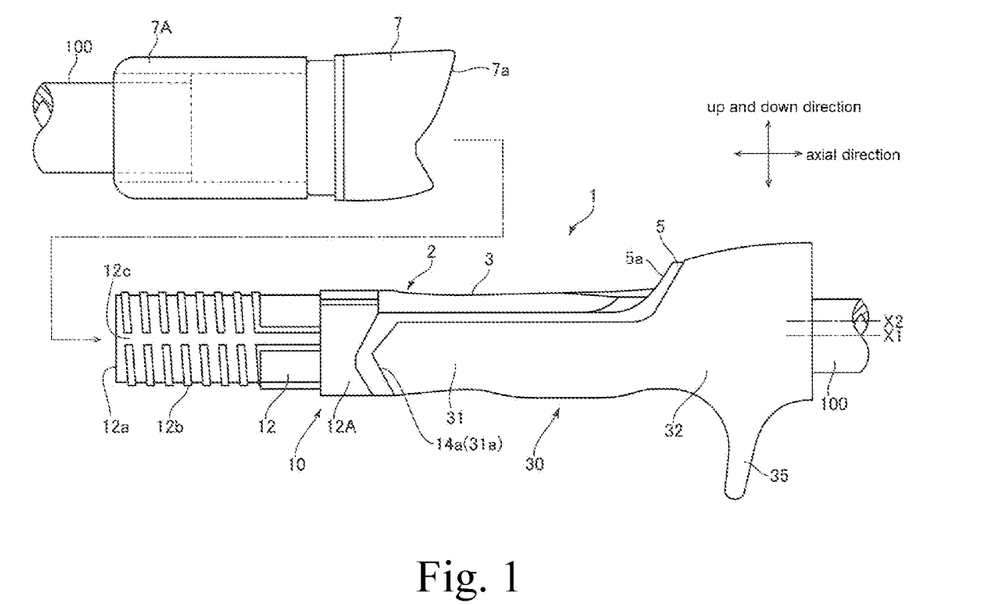
FIG. 1 is a side view showing a first example of a reel seat.
Figure 2:
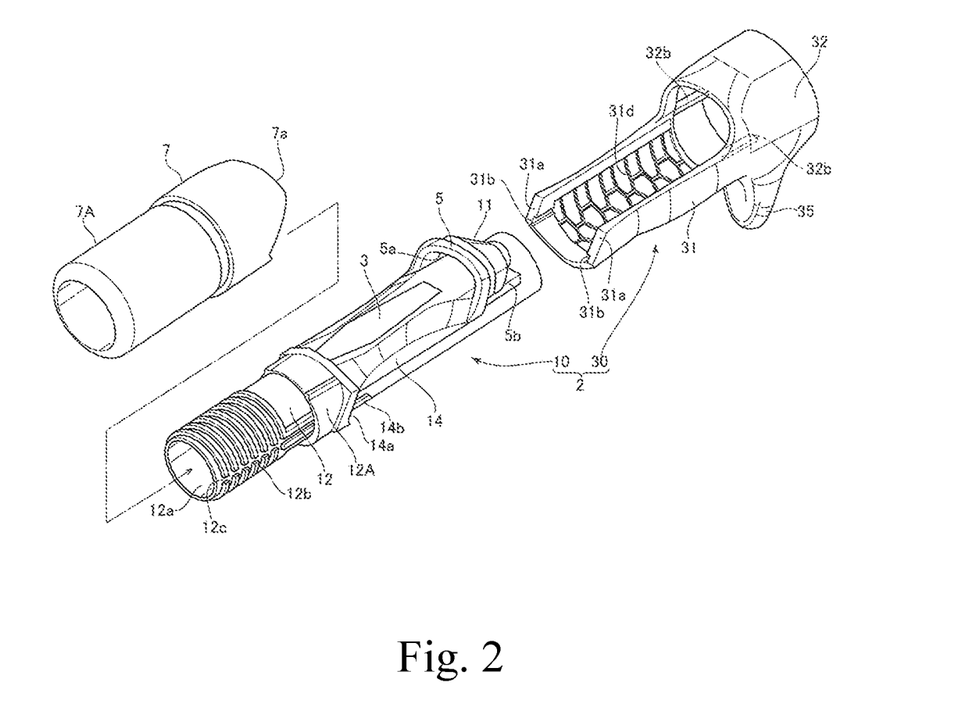
FIG. 2 is an exploded perspective view of the reel seat shown in FIG. 1.
Figure 3:
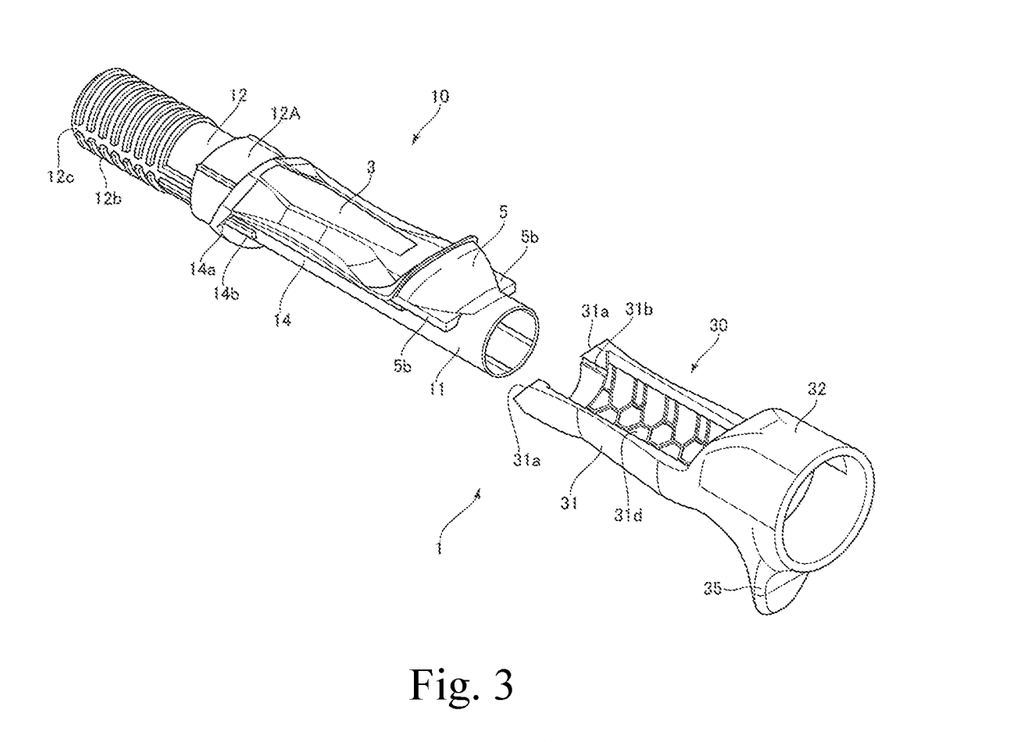
FIG. 3 is an exploded perspective view in which the reel seat shown in FIG. 1 is seen from the opposite side.
Figure 4:
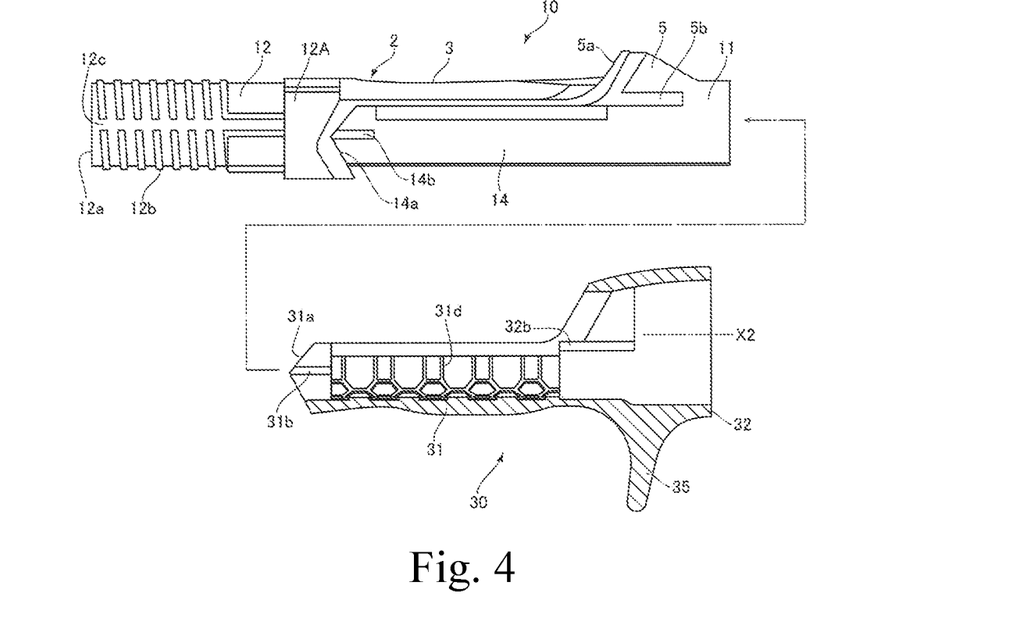
FIG. 4 is a view showing a state where a second main body slides to be installed in a first main body in the reel seat shown in FIG. 1.
Figure 5A:
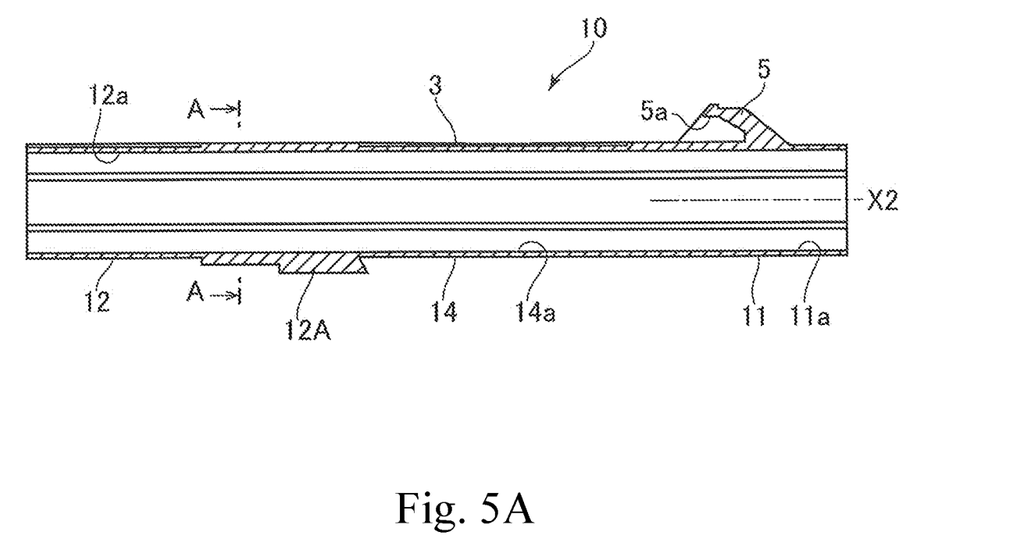
FIG. 5A is a sectional view along the axial direction.
Figure 5B:
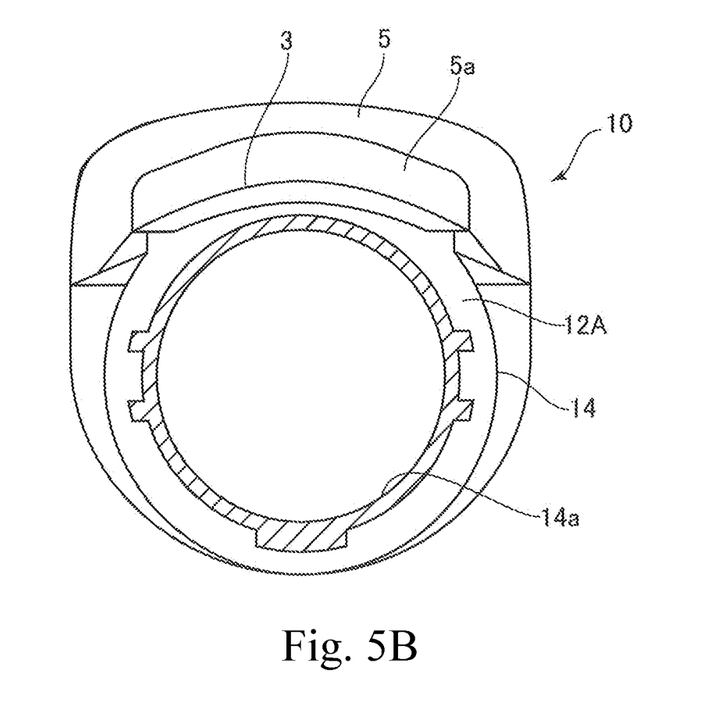
FIG. 5B is a sectional view along the line B-B.
Figure 6A:
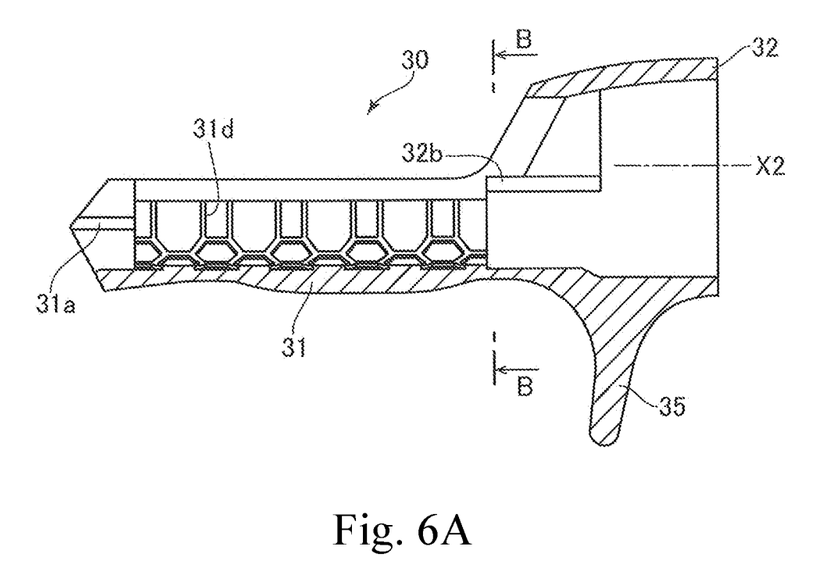
FIG. 6A is a sectional view along the axial direction.
Figure 6B:
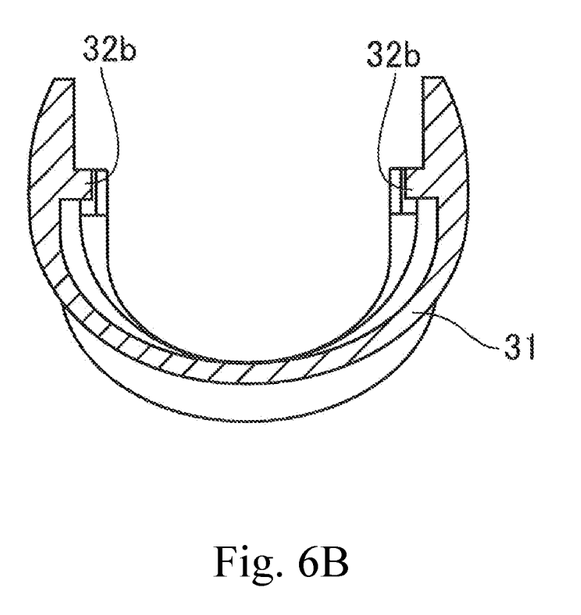
FIG. 6B is a sectional view along the line B-B.
Figure 7:
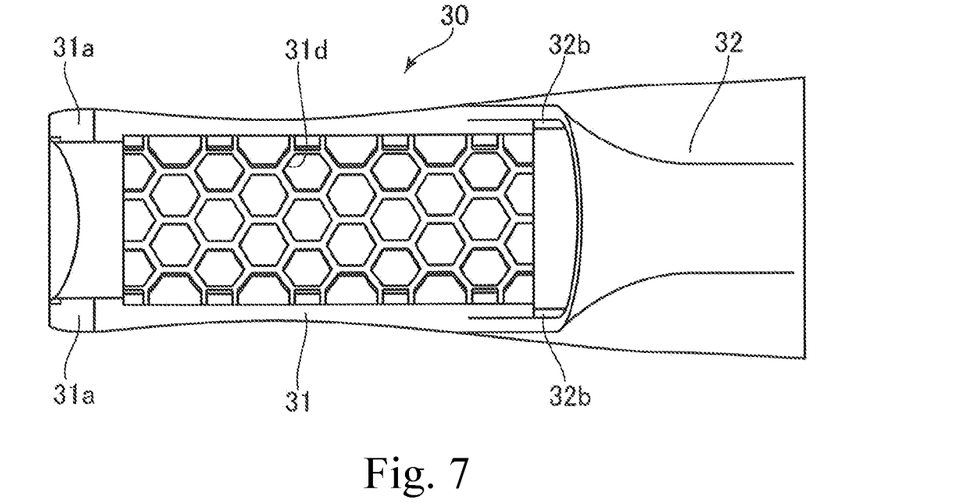
FIG. 7 is a plan view of the second main body.

FIGS. 1 to 7 are views showing a first example of the reel seat. FIG. 1 is a side view showing the reel seat, FIG. 2 is an exploded perspective view, FIG. 3 is an exploded perspective view seen from the opposite side, FIG. 4 is a view showing a state where a second main body slides to be installed in a first main body, FIG. 5 is a view showing the first main body, FIG. 5A is a sectional view along the axial direction, FIG. 5B is a sectional view along the line A-A, FIG. 6 is a view showing the second main body, FIG. 6A is a sectional view along the axial direction, FIG. 6B is a sectional view along the line B-B, and FIG. 7 is a plan view of the second main body.

A reel seat 1 is fixed to an outer peripheral surface of a rod (root rod) 100 forming a fishing rod by bonding or the like, and formed to install and fix a bait-casting reel as a fishing reel. Therefore, a reel foot mounting portion to be described later is positioned on the upper side. Regarding a fishing rod to which the reel seat is fixed, a configuration is not limited to a telescopic type, a joined type, a single pole type and the like. In FIG. 1, not the entire configuration but part of the fishing rod (part of the root rod) is shown.

The reel seat 1 has a seat main body 2 including a reel foot mounting portion 3 on which a reel foot of a fishing reel is mounted on the upper side, the seat main body having a fixed hood 5 being formed on the axially one end side (base end side) of the reel foot mounting portion 3, and a moving hood 7 being arranged on the seat main body on the axially other side (tip side) of the reel foot mounting portion 3 movably along the axial direction. The seat main body 2 has a divided structure. This divided structure has a first main body 10 including a part where the reel foot mounting portion 3, the fixed hood 5, and the moving hood 7 are arranged, the first main body being formed in a tubular shape secured on an outer peripheral surface of the inserted root rod, and a second main body 30 made of a material having strength equal to or less than the first main body 10, the second main body being disposed on and fixed to a surface of the first main body 10. By integrating these main bodies, the seat main body 2 is formed.

The first main body 10 is integrally made of, for example, a hard synthetic resin material such as nylon and ABS, or a plastic composite material into which reinforced fiber such as glass fiber and carbon fiber is mixed (FRP). On the back side (base end side) and the front side (tip side), cylindrical portions 11, 12 both positioned on the same axis are formed. The reel foot mounting portion 3 is formed in the middle of both the cylindrical portions 11, 12. In the first main body 10, a middle cylindrical portion 14 having a through hole 14a which passes through in the axial direction and has a circular section is formed on the lower side of the reel foot mounting portion 3. As shown in FIG. 5A, this through hole 14a extends on the straight line coaxially to and integrally with through holes 11a, 12a of the cylindrical portions 11, 12. The rod 100 is fitted into this part (through holes 11a, 14a, 12a), and the part is fixed to the outer peripheral surface of the rod by a bonding adhesive and the like.

In this example, since the rod 100 is fitted into the cylindrical portions 11, 12 and the middle cylindrical portion 14, an inner peripheral surface is formed to have a circular section but there is not always a need for forming an outer peripheral surface to have a circular section. An expanded portion or a recessed portion may be partly formed by a curved surface, a tilted surface and the like and, further, a flat surface or an opening may be formed. In that way, deformation can be made appropriately. Additionally, thickness is not limited as well. That is, the first main body 10 is only required that the rod 100 is fitted in over the longitudinal direction, and an outer surface may be formed in a non-circular shape (only required to be formed in a tubular shape).

On the front and back sides of the reel foot mounting portion 3, a pair of hood portions for fastening and fixing the reel foot of the mounted fishing reel is provided. The fixed hood 5 integrated with the cylindrical portion 11 is provided on the back side, and the rotation-operated moving hood 7 is arranged on the front side movably in the axial direction.

The fixed hood 5 is integrated with the cylindrical portion 11 to be expanded upward on the back side of the reel foot mounting portion 3, and includes an opening 5a that receives the reel foot.

The moving hood 7 on the front side of the reel foot mounting portion 3 is arranged movably in the axial direction in a state of covering the cylindrical portion 12. A male screw portion 12b is formed on an outer peripheral surface of the cylindrical portion 12, and a locking step portion 12A that regulates movement of the moving hood 7 is formed between the male screw portion 12b and the reel foot mounting portion 3. The moving hood 7 is arranged movably in the axial direction over the male screw portion 12a.

A nut member 7A to be screwed to the male screw portion 12b is locked to the moving hood 7. The moving hood 7 is moved in the axial direction by rotation-operating the nut member 7A. In this example, guide grooves 12c extending linearly in the axis direction are formed in the male screw portion 12b at one or more places (at two places at a 180 degree interval). At the time of rotation-operating the nut member 7A, the moving hood 7 does not rotate but slides only in the axial direction. Therefore, in a state where the reel foot is mounted on the reel foot mounting portion 3, when a back-side foot portion is fitted into the opening 5a of the fixed hood 5, the nut member 7A is rotation-operated in this state, and the moving hood 7 slides to the fixed hood side, a front-side foot portion of the reel foot is fitted into an opening 7a of the moving hood 7, and the reel foot is fastened and fixed between both the hoods 5, 7. By rotation-operating the nut member 7A in the opposite direction, the fishing reel installed and fixed between the hoods 5, 7 can be detached.

The second main body 30 includes a half-tube portion 31 superimposed on the middle cylindrical portion 14 of the first main body 10 so that the reel foot mounting portion 3 is exposed, and a tube portion 32 superimposed to cover the fixed hood 5. These have a function as a gripping portion to be gripped (to be abutted with a palm, or balls or roots of fingers) together with a reel main body at the time of actual fishing. That is, the half-tube portion 31 and the tube portion 32 of the second main body 30 are formed to cover the part where a large load is applied in a state where the reel is fixed, and at the time of operation, the part of the middle cylindrical portion 14 of the first main body 10 where the reel foot mounting portion 3 is formed and the cylindrical portion 11 part where the fixed hood 5 is formed.

In this example, the half-tube portion 31 and the tube portion 32 are only required to be formed in a shape to cover the first main body 10, and there is not always a need for forming the inner peripheral surface and the outer peripheral surface to have a circular section. For example, an expanded portion or a recessed portion (curved portion) may be partly formed by a curved surface, a tilted surface and the like, and further, a flat surface or an opening may be formed. In that way, deformation can be made appropriately. Additionally, thickness and regions to be covered are not limited as well. The first main body 10 may be partly exposed, or the second main body 30 may be formed to be larger than the first main body 10.

A trigger 35 on which, at the time of gripping and holding the seat main body with the reel main body, a finger of the hand can be placed is formed in the second main body 30. The trigger 35 is formed in the tube portion 32 of the second main body, and formed to project on the opposite side (lower side) of the side where the fixed hood 5 is arranged.

The second main body 30 is a part with which mainly a palm and balls of fingers are abutted, the part where no large load is applied unlike the first main body 10. Thus, it is possible to made the second main body of a material having strength equal to or less than strength of the first main body 10. Specifically, the second main body is preferably made of a material with which touch at the time of gripping, a gripping property, and outer appearance can be improved and further weight reduction can be achieved. For example, the second main body can be made of resin such as ABS, nylon, urethane, or thermoplastic elastomer, rubber and the like (as a matter of course, can be made of a thinned material which is the same kind as the first main body 10). That is, since the seat main body 2 has the divided structure of the first main body 10 which is the part where strength is required, and the second main body 30 made in consideration with the gripping property and weight reduction, it is possible to efficiently form the reel seat with which strength is high and weight is reduced.

The first main body 10 and the second main body 30 are respectively formed as separate bodies, and integrated by bonding, a press-fitting structure or the like. As shown in FIG. 3, locking structures to move the first main body 10 and the second main body 30 close to each other along the axial direction and integrate both the main bodies, and regulate rotation in the circumferential direction in an integrated state are provided. In this example, arrangement positions of the locking structures are not particularly limited. However, by providing the locking structures on both the axial end sides, and both the sides, it is possible to obtain a stable secured state at the time of integrating both the main bodies 10, 30.

Specifically, the locking structures are provided in a leading end part of the half-tube portion 31 and in a part of the tube portion 32 covering the fixed hood 5 respectively on both the sides orthogonal to the axial direction. The locking structure of the leading end part of the half-tube portion 31 of the second main body 30 is formed by recessed grooves 31b formed on an inner surface of a leading end portion of the half-tube portion 31 from leading end edges 31a to have predetermined length in the axial direction. The locking structure on the leading end side of the middle cylindrical portion 14 of the first main body 10 is formed by projected portions 14b formed in the axial direction so that the recessed grooves 31b are fitted into an outer surface of the middle cylindrical portion (see FIGS. 2 and 3). In this example, to not make a change in the rotating direction at the time of integrating both the members, it is preferable to cut the leading end edges 31a on both the sides of the half-tube portion 31 in a mountain shape in the axial direction, and cut a part on the leading end side of the middle cylindrical portion 14 in a valley shape so that the leading end edges 31a are fitted in.

The locking structure of the part covering the fixed hood 5 is respectively formed on both the sides and on the lower side of an outer surface of the fixed hood 5, including projected portions 5b formed in the cylindrical portion 11 of the first main body 10, the projected portions extending in the axial direction, and projected portions 32b formed at corresponding positions of the tube portion 32 of the second main body 30, the projected portions extending in the axial direction to be brought into contact while sliding in the axial direction along lower surfaces of the projected portions 5b.

According to the locking structures described above, it is possible to easily integrate both the members by letting the second main body 30 slide with the first main body 10 in the axial direction, and to fix both the members in an axially fixed state. In this example, in the locking structure provided on the fixed hood side, upper surfaces of the projected portions 32b of the second main body 3 slide with the lower surfaces of the projected portions 5b of the first main body 10. Thus, it is possible to integrate both the members by letting the second main body 30 slide in the axial direction while bringing the second main body close to the first main body 10 from the obliquely upper side. Therefore, as described later, even when patterns 31d made by recesses and projections are formed on an inner surface of the half-tube portion 31, it is possible to prevent damages on the patterns at the time of integrating both the members.

As described above, the trigger 35 is formed in the tube portion 32 of the second main body 30, and the projected portions 5b and the projected portions 32b serving as the locking structure are provided in the vicinity of the trigger 35 (the projected portions 5b, 32b are provided to cross a turning surface of the trigger at the time of applying circumferential turning force to the trigger 35). Thus, it is possible to effectively prevent a change in the rotating direction of the trigger 35 to which a large load is applied at the time of actual fishing, and to provide the reel seat having stabilized strength even with the divided structure.

Both the first main body 10 and the second main body 30 described above may be fixed by applying a bonding adhesive to the superimposed point or the locking structure part, or may be integrated not by using a bonding adhesive but by a locking structure (such as a fitting structure of recessed and projected portions).

As described above, the second main body 30 of the above configuration can be made of various materials but may be made of a resin material having a transparent property. The second main body 30 is disposed on to cover the first main body 10. Thus, by making of a material having a transparent property, it is possible to visually recognize the first main body 10 through the second main body 30, and to improve the outer appearance.

When the second main body 30 is made of a material having a transparent property, it is also possible to form various patterns on an inner surface. Specifically, as shown in FIGS. 2 and 7, when patterns made by recesses and projections, for example, the hexagonal patterns 31d shown in the figures are formed on the inner surface of the half-tube portion 31, it is possible to visually recognize the patterns after assembling both the members, and to improve the outer appearance. In this example, in addition to the patterns formed with recesses and projections, the patterns may be made by texts, shapes and the like, or patterns, texts, shapes and the like may be attached to the inner surface by printing, seals and the like. In that way, deformation can be made appropriately.

According to the reel seat 1 described above, the seat main body 2 has the divided structure of the first main body 10 including the part where a large load is applied and strength is required (the part where the reel foot mounting portion 3 on which the reel foot of the fishing reel is mounted, the fixed hood 5 that fixes the reel foot, and the moving hood 7 are arranged), and the second main body 30 having the region (gripping portion) to be gripped and held mainly at the time of actual fishing, and different materials can be used. Thereby, while a shape of a good gripping property is obtained as a whole, it is possible to easily efficiently form a punched portion, a cutout, an opening and the like to reduce weight. That is, since the first main body 10 is covered by the second main body 30 and no hand touches, it is possible to make thinning, make punching, or forming a cutout or the like according to needs. Even when such a part is formed, the gripping property is not influenced, the fishing rod is lightweight, and a handling property can be improved.

In particular, by making the first main body 10 requiring strength of a material excellent in strength, for example, a plastic composite material reinforced by reinforced fiber such as glass fiber and carbon fiber (FRP) or the like, and making the second main body 30 of a material with which touch at the time of gripping, the gripping property, and the outer appearance can be improved and weight reduction can be achieved, for example, resin such as ABS and nylon, or elastomer, rubber and the like, it is possible to efficiently form the reel seat with which strength is high and weight is reduced. In a conventional integrated seat main body, molding failure due to equalization of thickness occurs. However, by having the divided structure and disposing the second main body 30 to be superimposed on the first main body 10, it is possible to reduce such molding failure.

In the above configuration, it is possible to achieve weight reduction by forming a punched portion, a cutout and the like in the first main body 10. However, such a punched portion, a cutout, recesses, projections and the like may also be formed in the second main body 30. In particular, such a punched portion, a cutout, recesses, projections and the like are preferably formed in a part with which the gripping property is not influenced. Alternatively, an outer surface of the half-tube portion 31 of the second main body 30 may be partly expanded along the axial direction to fit well with balls of fingers.

In the reel seat 1, a soft member having a good gripping property (such as urethane, EVA, thermoplastic elastomer, and rubber) may separately be provided in a part to be gripped and abutted with fingers. For example, the nut member 7A may be disposed with such a material, the cylindrical portion 11 of the first main body 10 may project on the back side, and a gripping member made of the above materials may be disposed on an outer surface of the cylindrical portion.

The superimposed part between the first main body 10 and the second main body 30 may be in a closely attached state. However, a clearance may be partly formed between both the main bodies. That is, both the members may be superimposed so that a clearance is provided between at least one of the half-tube portion 31 and the tube portion 32 of the second main body 30 and the first main body 10. With such a configuration, it is possible to expand the gripping portion without increasing thickness. Thus, it is possible to improve the gripping property while more efficiently reducing weight.

Further, the above second main body 30 may be formed in a shape in which the axis X2 is offset from the axis X1 of the first main body 10 at the time of fixing to the first main body 10. By forming in such a shape of offset, the tube portion 32 is shifted upward, and it is possible to enhance the gripping property. The direction of offset is arbitrary.

Figure 8A:
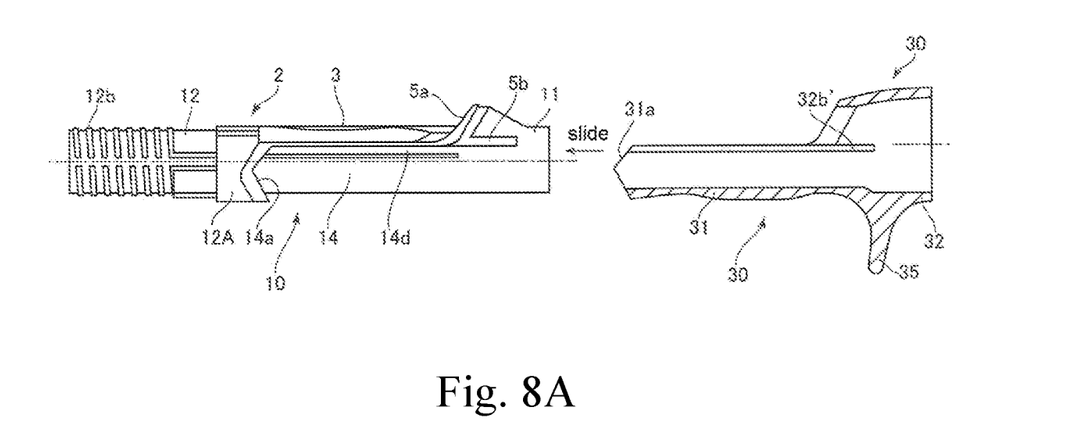
FIG. 8A is a view showing a state where the second main body slides to be installed in the first main body.
Figure 8B:
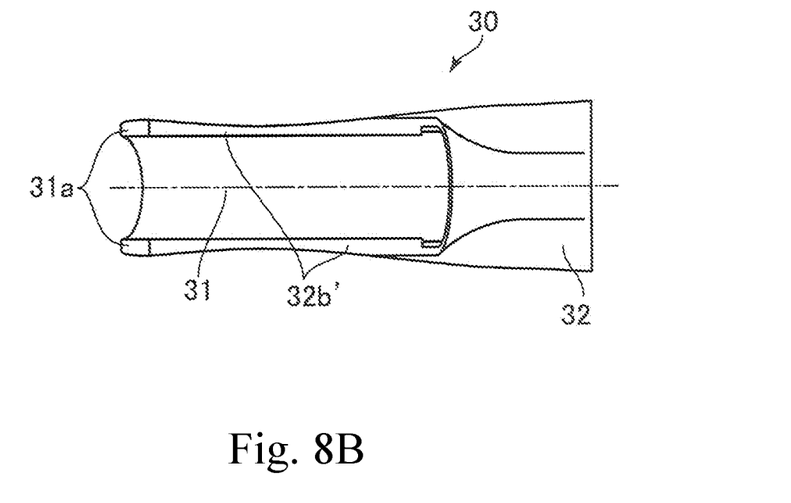
FIG. 8B is a plan view of the second main body.

FIG. 8 is a view showing a modified example of a locking structure. FIG. 8A is a view showing a state where the second main body slides to be installed in the first main body, and FIG. 8B is a plan view of the second main body.

The locking structure of this modified example is formed by projected portions 32b' formed to extend over the substantially entire region along the axial direction on both the sides of the half-tube portion 31 of the second main body 30, and recessed grooves 14d formed to extend along the axial direction on both the sides of the middle cylindrical portion 14 of the first main body 10 so that the projected portions 32b' are fitted.

According to such a locking structure, it is possible to integrate both the main bodies by substantially matching the second main body 30 with the first main body 10 in the axial direction and straightaway letting the second main body slide in the axial direction.

Figure 9A:
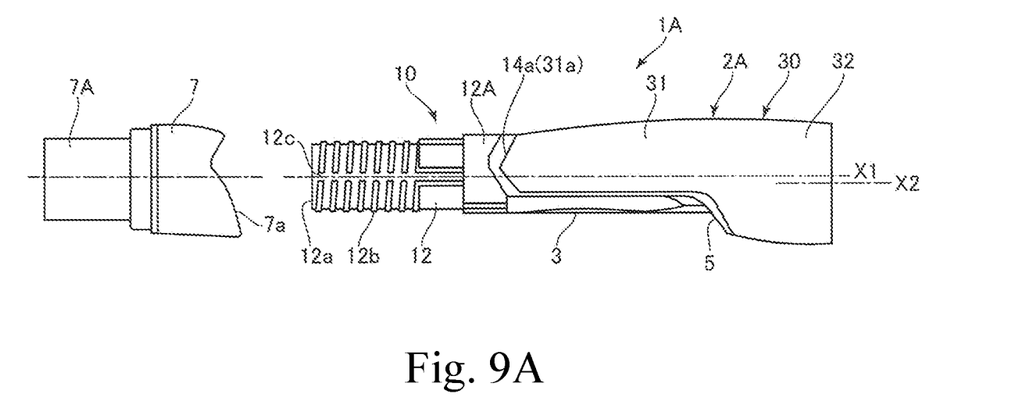
FIG. 9A is a side view.
Figure 9B:
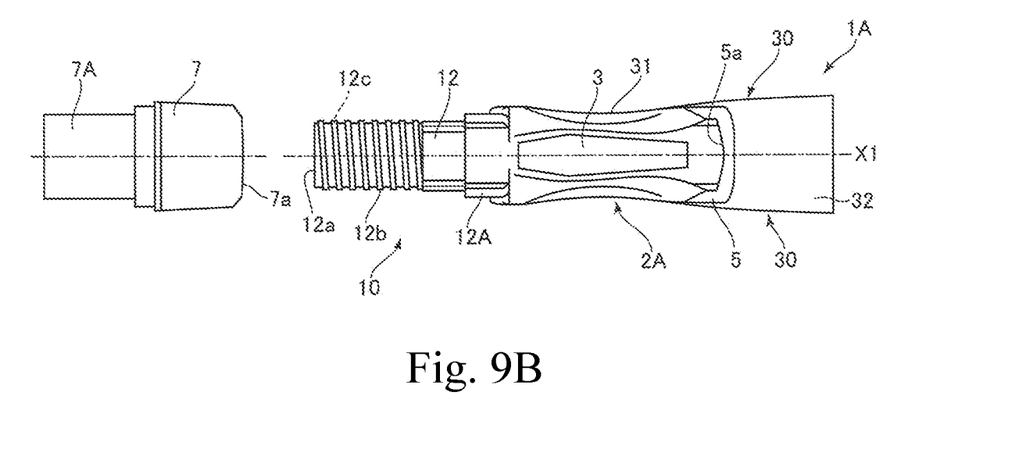
FIG. 9B is a plan view (lower surface view).

FIG. 9 shows a second example of my reel seat. FIG. 9A is a side view, and FIG. 9B is a plan view (lower surface view).

A reel seat is formed so that a spinning reel is installed, and the spinning reel is installed and fixed to a reel foot mounting portion directed to the lower side. In FIG. 9, the same constituent elements as the above first example will be given the same reference signs.

A seat main body 2A of a reel seat 1A is formed by integrating a first main body 10 and a second main body 30 as well as the above example. At the time of use, a half-tube portion 31 and a tube portion 32 of the second main body 30 are arranged and directed to the lower side to form a region (gripping portion) to be gripped and held. Therefore, since the half-tube portion 31 of the second main body 30 is directed to the upper side unlike the first example, the half-tube portion is not a part with which the ball side of fingers of a hand is abutted but a part gripped mainly by a palm from the upper side. Thus, to more easily grip and hold, it is preferable to form the half-tube portion to have a slightly larger diameter than the first example.

Even with the reel seat 1A of such a configuration, the same operations and effects as the above example can be obtained.

The examples are described above. However, my reel seat is not limited to the above examples but can be variously deformed.

The reel seat 1 of the above divided structure is not limited to the shape shown in the figures but can be variously deformed. For example, regarding the hood portions 5, 7 that fix the reel foot, the back side may be formed by the moving hood, and configurations of the hood portions can be appropriately deformed. In the locking structures of the first main body 10 and the second main body 30, the recessed portions and the projected portions may be exchanged with each other, and a locking shape of both the portions (such as a fitting shape and a contact shape) and formation positions are arbitrary. Further, regarding a mode of the divided structure of both the members and an engagement method, not sliding along the axial direction but fitting in in the up and down direction and the like may be performed. In that way, deformation can be made appropriately.

The invention claimed is:

1. A reel seat comprising:
a seat main body including a reel foot mounting portion on which a reel foot of a fishing reel is mounted, the seat main body having a fixed hood being formed on an axially one end side of the reel foot mounting portion, and a moving hood being arranged on the seat main body on another side of the reel foot mounting portion movably along an axial direction,
wherein the seat main body has a divided structure of a first main body including a part where the reel foot mounting portion, the fixed hood, and the moving hood are arranged, the first main body being formed in a tubular shape secured on an outer peripheral surface of a fishing rod, and a second main body made of a material having strength equal to or less than the first main body, the second main body being disposed on and fixed to a surface of the first main body,
wherein the second main body forms a gripping portion including a half-tube portion which is superimposed on the first main body so that the reel foot mounting portion is exposed, and a tube portion which is superimposed on the first main body to cover the fixed hood, and
wherein the first main body defines an axis that is coaxial with a central axis of the fishing rod when the fishing rod is installed in the first main body, wherein the axis of the first main body and a central axis of one end of the tube portion of the second main body are offset from each other, wherein the one end of the tube portion is opposite the half-tube portion,
wherein the second main body is made of a resin material having a transparent property,
wherein patterns are formed on an inner surface of the half-tube portion of the second main body that is made of the resin material having the transparent property.

2. The reel seat according to claim 1, wherein the first main body and the second main body have locking structures to regulate rotation in a circumferential direction in an integrated state, and
wherein the locking structures are provided on both the sides orthogonal to the axial direction in a leading end part of the half-tube portion and a part of the tube portion covering the fixed hood.

3. The reel seat according to claim 2, wherein the locking structures have recessed and projected portions configured to be fixed by letting the second main body slide with the first main body in the axial direction.

4. The reel seat according to claim 2,
wherein in the tube portion of the second main body, a trigger is formed on an opposite side of the fixed hood, and
wherein the locking structures are provided adjacent the trigger.

5. A fishing rod to which the reel seat according to claim 1 is secured.

6. The reel seat according to claim 1, wherein the patterns are visually recognizable on the reel seat when the second main body is disposed on and fixed to the surface of the first main body.

7. The reel seat according to claim 1, wherein the patterns that are formed on the inner surface of the half-tube portion abut a portion of the surface of the first main body that has no patterns.

8. The reel seat according to claim 1, wherein the patterns include a plurality of recesses and projections that are formed on the inner surface of the half-tube portion.

9. The reel seat according to claim 1, wherein the patterns define a plurality of shapes.

10. The reel seat according to claim 1, wherein the patterns formed on the inner surface of the half-tube portion abut a smooth cylindrical surface of the first main body.

11. The reel seat according to claim 2, wherein the patterns formed on the inner surface of the half-tube portion are located distally from the leading end part in the axial direction.

* * * * *